United States Patent [19]

Bílek et al.

[11] Patent Number: 5,197,522
[45] Date of Patent: Mar. 30, 1993

[54] CONNECTING DEVICE FOR A HEALDFRAME IN A WEAVING MACHINE

[75] Inventors: Jan Bílek, Na okruhu; Emil Špidlen, Kraluv Haj; Jan Nechanický, Arbesova, all of Czechoslovakia

[73] Assignee: Tovarny textilnich potreb, Elitex, a.s. Jablonecna Nisou, Czechoslovakia

[21] Appl. No.: 844,859

[22] Filed: Mar. 3, 1992

[30] Foreign Application Priority Data

Mar. 6, 1991 [CS] Czechoslovakia .................. 575-91

[51] Int. Cl.$^5$ .................................. D03C 9/06
[52] U.S. Cl. .................................. 139/91; 403/362; 403/381
[58] Field of Search ............ 403/362, 381, 373; 139/91, 92

[56] References Cited

U.S. PATENT DOCUMENTS

| | | | |
|---|---|---|---|
| 3,753,450 | 8/1973 | Koch | 139/91 |
| 4,230,159 | 10/1980 | Shimizu | 139/91 |
| 4,275,772 | 6/1981 | Shimizu | 139/91 |
| 4,355,667 | 10/1982 | Shimizu | 139/91 |
| 4,883,095 | 11/1989 | Maruyama et al. | 139/91 |
| 4,911,574 | 3/1990 | VanderPol et al. | 403/381 X |

FOREIGN PATENT DOCUMENTS 0189216 1/1986 European Pat. Off. ........... 139/91

*Primary Examiner*—Andrew M. Falik
*Attorney, Agent, or Firm*—Ostrolenk, Faber, Gerb & Soffen

[57] ABSTRACT

A healdframe (heddle frame) for producing a shed of warp threads, in particular in non-orthodox weaving machines which operate at high frequencies. The healdframe includes a heald rod (1) which has a hollow area (9). Flat protrusions (8) of the edge piece (2) are inserted into the hollow area (9) to secure the edge piece (2) to the heald rod (1). In the flat protrusion (8) of the edge piece (2) is created a cylindrical recess (7) in which a clamping segment (3) is pivotally or rotatably mounted. To secure the flat protrusion (8) in the heald rod (1), a pressure device such as a bolt (5) bears on a front part of the clamping segment (3) while a rear part of the clamping segment (3) bears on a rest (4) fixed in the heald rod (1).

4 Claims, 2 Drawing Sheets

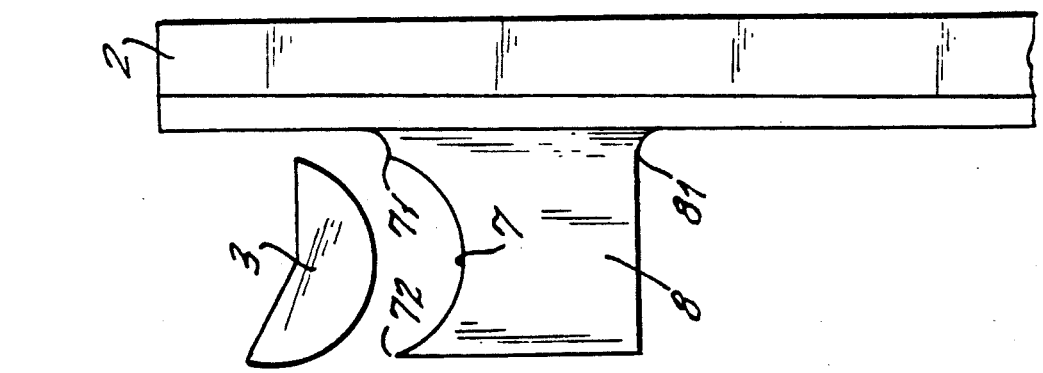
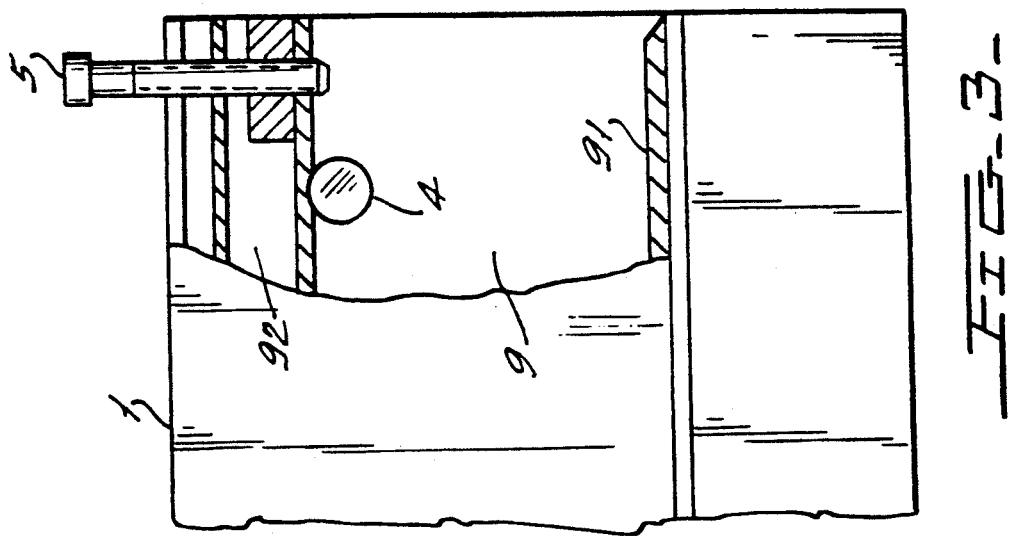
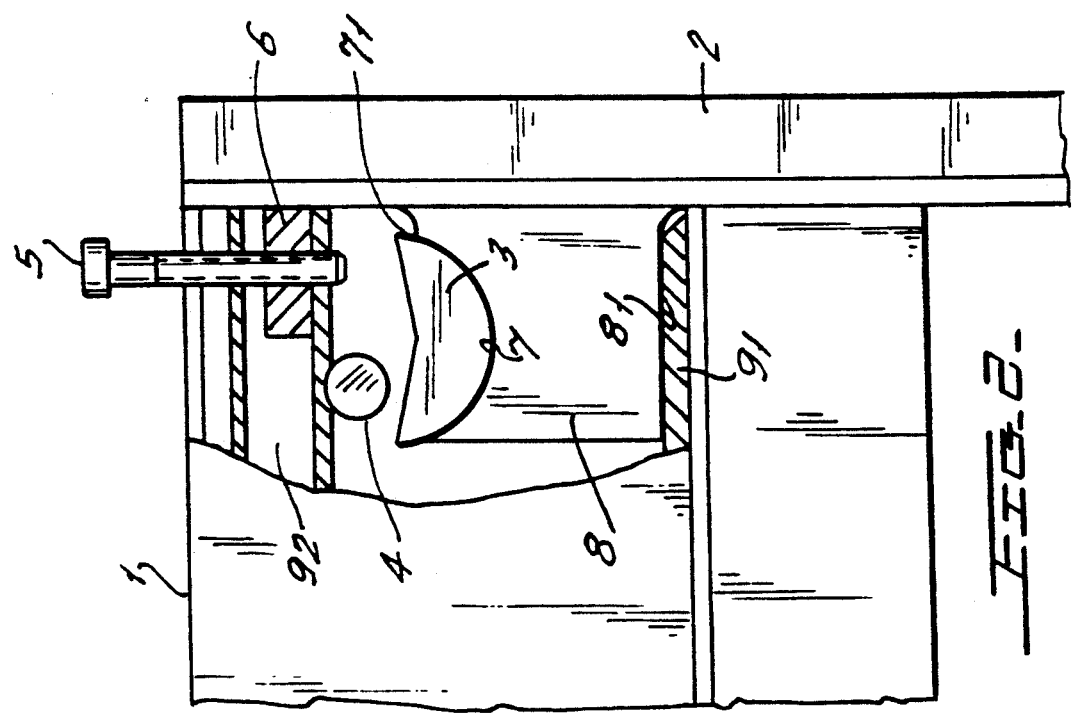

CONNECTING DEVICE FOR A HEALDFRAME IN A WEAVING MACHINE

FIELD OF THE INVENTION

The invention relates to an improvement in a healdframe (heddle frame) of a weaving machine. More particularly, the invention relates to a device for connecting a healdframe, which comprises a heald rod with a hollow internal area, to an edge piece (healdframe end), the device including protrusions on the edge piece which are inserted into the heald rod.

BACKGROUND OF THE INVENTION

In a weaving machine, in order to form the shed, the edge pieces of the healdframes move in guides, either on the outer or on the inner surfaces. The decreasing depth of the harness system involves decreasing the thickness of the healdframes. It becomes very difficult to ensure a sufficiently strong, and at the same time disassemblable, connection of the heald rods with the edge pieces, which is indispensable for obtaining high rigidity and long service life of the healdframe as a whole, at the high frequencies experienced in non-orthodox weaving machines.

Prior art healdframes exist in which a disassemblable connection of a heald rod with an edge piece is made by means of connecting means and screws passing toward the heald rod through holes in the edge pieces. This type of connection of the heald rod with the edge piece impairs the profile of the healdframe edge piece, as a result of the holes, and reduces the strength and rigidity of the healdframe proper.

In other known healdframes, the fixed connection is provided by a protrusion on the edge piece which is inserted into the hollow area of the healdframe heald rod, and by coupling means situated chiefly in the heald rod proper. Such connections of the heald rod and the edge piece are as a rule complicated and consist of a plurality of coupling means.

Examples of conventional means of connecting an edge piece to a healdframe are disclosed in U.S. Pat. No. 4,883,095 issued Nov. 28, 1989; and EP 0 328 953 A1 published Aug. 23, 1989, the disclosures of which are expressly incorporated by reference herein.

SUMMARY OF THE INVENTION

The invention aims to do away with the above drawbacks by creating a new type of connection between the edge piece and the heald rod, offering both high rigidity and service life and reduced expenditure of labor in production.

This has been achieved by the healdframe according to the disclosed embodiment of the invention, in which a protrusion of the edge piece has a recess in which a clamping device is mounted. Pressure means in the heald rod bears on one part of the clamping device, and a rest fixed in the heald rod bears on another part of the clamping device.

It is advantageous for the protrusion to be substantially flat. The recess is preferably cylindrical and the clamping device is preferably a clamping segment in the shape of a cylinder cut off by plane surfaces which are parallel to its axis and define an obtuse angle.

It is also advantageous for the rest to be a support pin whose ends are seated in the heald rod. The rest preferably extends from one face to the opposite face of the heald rod, through the hollow interior area of the heald rod.

A central advantage of this new type of connection between the edge piece and the heald rod of the healdframe is that it ensures high strength of the connection and, consequently, high rigidity and service life of the healdframe, while permitting it to be easily disassembled and enabling uncomplicated production of the healdframe parts. Another advantage is that this connection system can be used with a healdframe edge piece having any profile in the guide area, and with any embodiment of a heald rod having at least one hollow area.

Other features and advantages of the present invention will become apparent from the following description of the invention which refers to the accompanying drawings.

BRIEF DESCRIPTION OF THE DRAWING

FIGS. 1-3 are fragmentary cross-sectional views of part of a healdframe of a weaving machine according to an embodiment of the invention, schematically showing the connection of the heald rod and the edge piece of the healdframe; in which:

FIG. 1 shows the healdframe components after final connection;

FIG. 2 shows the healdframe components after they have been assembled but prior to final connection; and FIG. 3 shows the healdframe components before assembly.

DETAILED DESCRIPTION OF AN EMBODIMENT OF THE INVENTION

Figure 1:
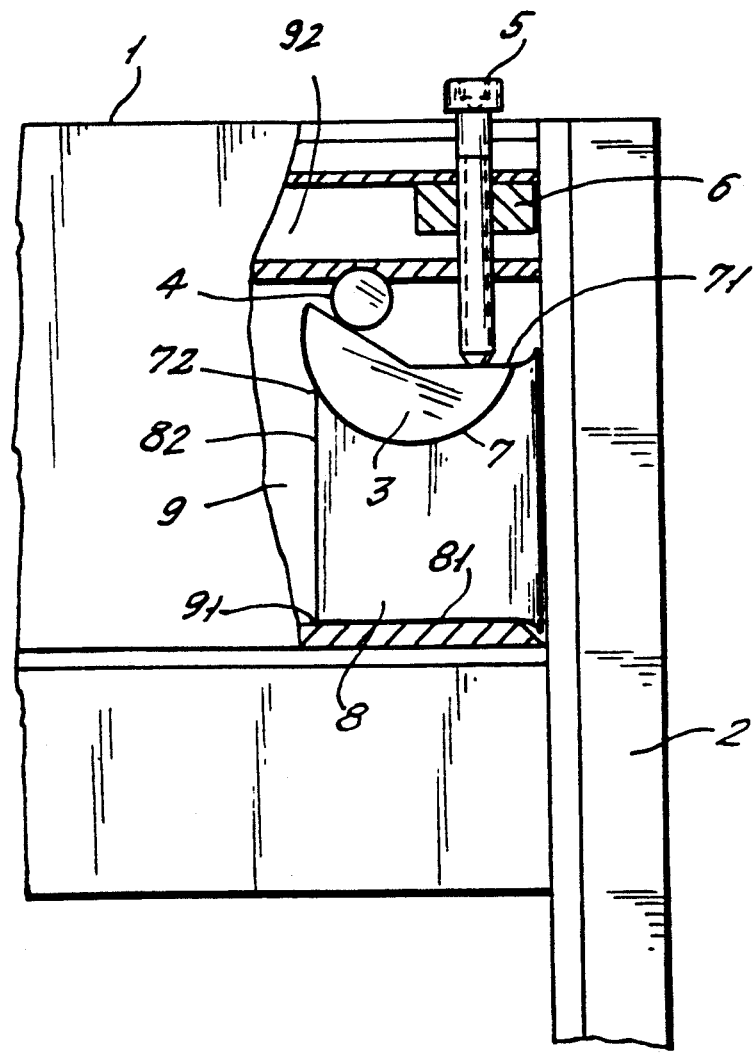

Referring to FIGS. 1-3, in a healdframe according to an embodiment of the invention, an edge piece 2 is provided with a flat protrusion 8 in the area of connection with a heald rod 1. The flat protrusion 8 is inserted into a hollow area 9 of the heald rod 1, the thickness of the protrusion 8 corresponding to the width of the hollow area 9 of the heald rod 1. On the flat protrusion 8 is provided a support surface 81 bearing on an inner support surface 91 provided in the hollow area 9 of the heald rod 1. Formed in a surface opposite to the support surface 81 there is provided a cylindrical recess 7 in the flat protrusion 8. A clamping segment 3 shaped as a sector of a cylindrical body is freely rotatably mounted in the cylindrical recess 7.

In the embodiment, the clamping segment 3 has the shape of a cylinder cut off by at least two plane surfaces parallel to its axis and defining an obtuse angle.

Alternatively, the clamping segment 3 can be shaped as a cylinder with more than two plane surfaces, of which at lest two make an obtuse angle (not shown). In another alternative (not shown), some plane surfaces can be replaced by surfaces partly curved or fitted with various suitable projections or recesses. The thickness of the clamping segment 3 corresponds to the width of the hollow area 9 of the heald rod 1.

The cylindrical recess 7 in the flat protrusion 8 of the edge piece 2 is shaped in such a way that the deepest point of the cylindrical recess lies between the beginning 71 of the cylindrical recess 7 at the edge piece 2 and the end 72 of the cylindrical recess 7 at the front wall 82 of the flat protrusion 8 of the edge piece 2, as illustrated in the Figure. Alternatively, the end of the cylindrical recess 7 can be made in the wall of the opposite support surface 81 of the flat protrusion 8 (not shown).

A rest, which may be a support pin 4, for instance, is fixed over the flat protrusion 8 of the edge piece 2 and extends across the hollow area 9 of the heald rod 1. The permanent connection of the heald rod 1 and of the support pin 4 is obtained for instance by clinching the support pin 4 on its ends or in another known manner.

Clinching the support pin 4 to fix it in the heald rod 1 advantageously increases the rigidity of the heald rod 1 proper, in the area of its connection with the edge piece 2.

In the outer longitudinal ribs of the heald rod 1, over the flat protrusion 8, are coaxial holes for accommodating pressure means, represented in the illustrated embodiment by a bolt 5 with a nut 6 seated in an outer hollow area 92 of the heald rod 1. The nut 6 is freely seated in the hollow area 92 of the heald rod 1. By retightening the bolt 5, the nut 6 bears on the wall of the hollow area 92 of the heald rod 1 and is thus exactly fixed in position.

The act of connecting the heald rod 1 and the edge piece 2 is carried out as follows:

The clamping segment 3 is inserted into the cylindrical recess 7 in the flat protrusion 8 of the edge piece 2. Then, the flat protrusion 8, together with the inserted clamping segment 3, is introduced into the hollow area 9 of the heald rod 1. Then, the front part of the clamping segment 3 (toward the right in the Figure) is exposed to pressure generated by pressure means, for example, by screwing the bolt 5 into the nut 6. The tightening of the bolt 5 makes the nut 6 bear on the wall of the hollow area 92 of the heald rod 1 and thus define exactly the nut position, while the bolt 5 exerts pressure force on the clamping segment 3. The clamping segment 3 turns in the cylindrical recess 7 of the flat protrusion 8 of the edge piece 2, until the top surface of the rear part of the clamping segment 3 (toward the left in the Figure) comes to bear on the support pin 4. In this way, a solid (fixed) yet disassemblable connection between the heald rod 1 of the healdframe, and the edge piece 2, is achieved.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A healdframe for a weaving machine comprising:
   a heald rod which defines a hollow internal area which is accessible from the exterior;
   an edge piece having a protrusion for being inserted into said hollow internal area; and
   securing means for securing the protrusion in the hollow internal area of the heald rod so as to secure the edge piece to the heald rod, said securing means comprising:
   recess means formed in said protrusion; and
   clamping means in said recess means for engaging said heald rod and thereby clamping said protrusion in said hollow area;
   wherein said recess means comprises a recess having a predetermined shape formed in a first side of said protrusion which faces in a first direction, and said clamping means comprises:
   a clamping segment having an outer contour corresponding to the shape of the recess so as to be rotatable along said outer contour, said clamping segment having at least first and second faces facing generally in said first direction and defining between them an angle;
   pressure means in said heald rod for bearing on said first face to urge rotation of said clamping segment; and
   rest means fixed in the heald rod for being engaged by said second face in response to said rotation, said rest means preventing said protrusion from being withdrawn from said heald rod when said rest means and second face are engaged.

2. A healdframe as in claim 1, wherein said rest means comprises a support pin having ends seated in said heald rod, extending through said hollow area in a thickness direction of said heald rod.

3. A healdframe as in claim 1, wherein said recess and clamping segment have cylindrical profiles, and said clamping segment has the shape of a cylinder cut by at least two plane surfaces parallel to the axis of the cylinder which define between them an obtuse angle, so as to form at least said first and second faces.

4. A healdframe as in claim 3, wherein said rest means comprises a support pin having ends seated in said heald rod, extending through said hollow area in a thickness direction of said heald rod.

* * * * *